United States Patent
Ryder et al.

[15] 3,657,491
[45] Apr. 18, 1972

[54] CORD REEL

[72] Inventors: Francis Eugene Ryder; Ronald Orville Gordon, both of Chicago, Ill. 60631

[73] Assignee: Illinois Tools Works Inc., Chicago, Ill.

[22] Filed: May 28, 1970

[21] Appl. No.: 41,236

[52] U.S. Cl. ............................191/12.2, 242/80, 242/118.41
[51] Int. Cl. ......................................H02g 11/02, H02g 11/06
[58] Field of Search ......................191/12.2 R, 12.2 A, 12.4; 242/118.41, 80, 107.1

[56] References Cited

UNITED STATES PATENTS

| | | | |
|---|---|---|---|
| 3,061,234 | 10/1962 | Morey | 191/12.2 R |
| 3,374,319 | 3/1968 | Stahmer | 191/12.2 R |
| 3,432,623 | 3/1969 | Blanch et al. | 191/12.2 R |
| 3,542,172 | 11/1970 | Meletti | 191/12.2 R |

Primary Examiner—Drayton E. Hoffman
Attorney—Robert W. Beart, Michael Kovac and Jack R. Halvorsen

[57] ABSTRACT

An automatically retractable cord reel having continuous solid conductors from the free end of the extensible cord through a fixed flat conductor attached to the power source. The fixed conductor is a flat conductor helically disposed and axially restrained within a secondary cavity in the reel with the radially outer end of the flat conductor connected to the cord and the inner end of the flat conductor fixedly connected to the source. Means are also provided to position the reel in predetermined angular relationships to the assembly mounting so that the cord is maintained in an extended condition without tension.

12 Claims, 11 Drawing Figures

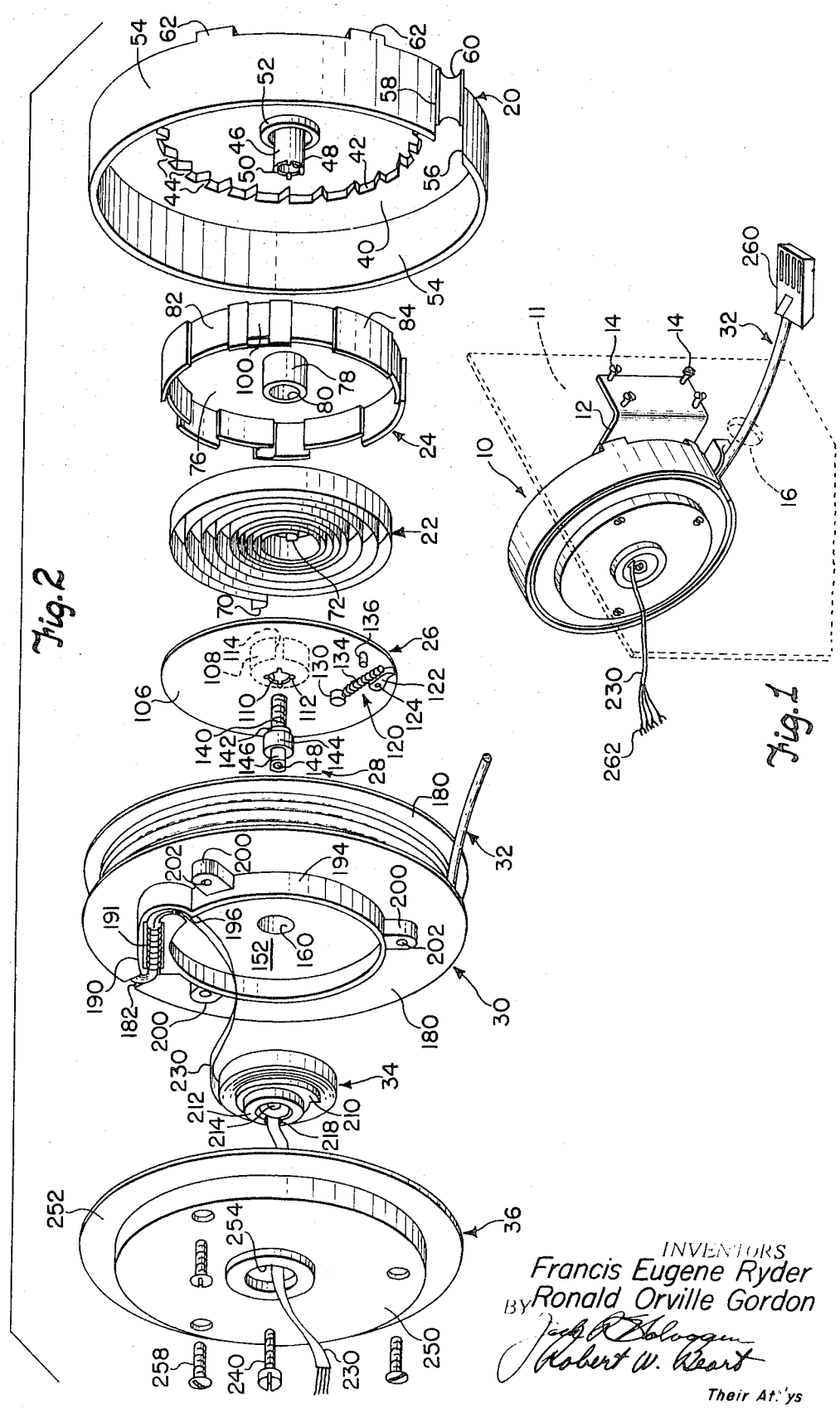

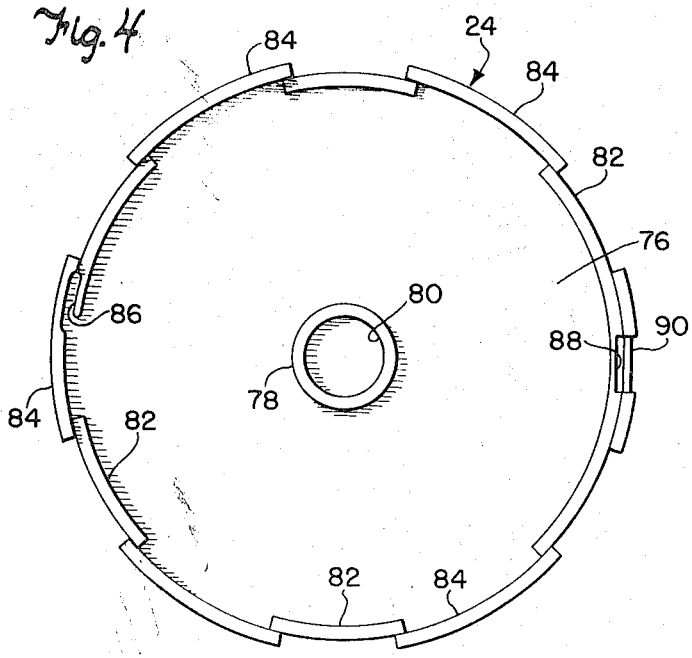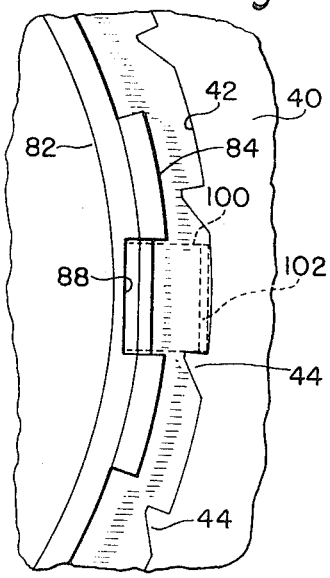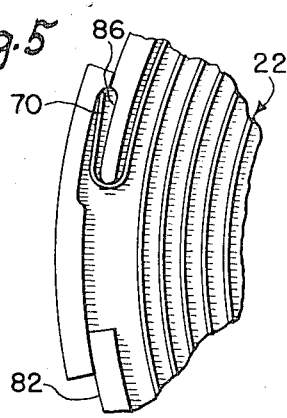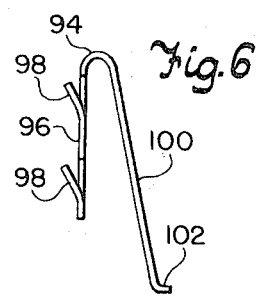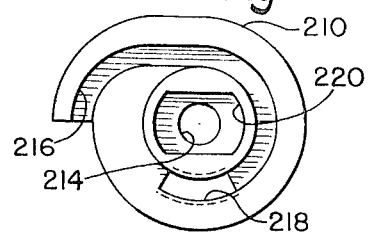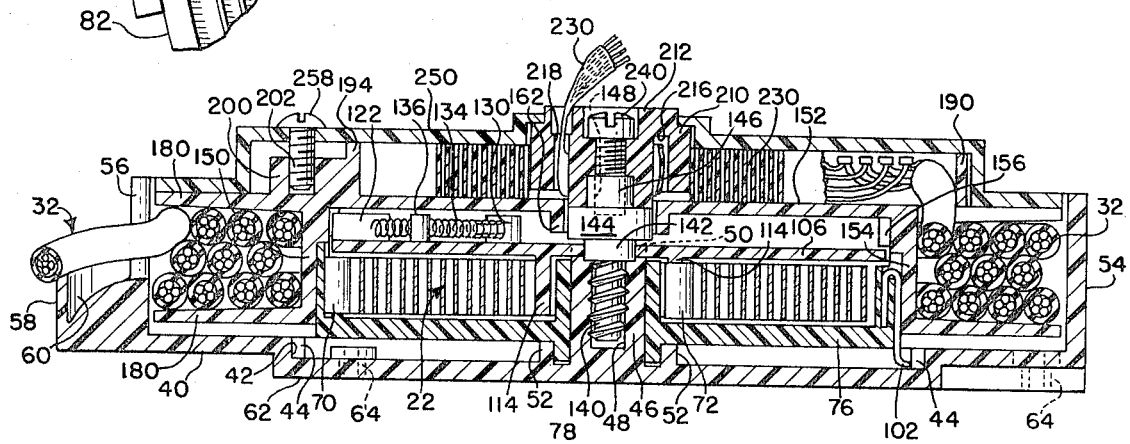

Patented April 18, 1972 3,657,491

INVENTORS
Francis Eugene Ryder
BY Ronald Orville Gordon

Their Att'ys

INVENTORS
Francis Eugene Ryder
BY Ronald Orville Gordon

Their Att'ys

CORD REEL

BACKGROUND OF THE INVENTION

It is often desirable where long lengths of cord are to be utilized, i.e. electric trouble lights, telephone installations, etc., to provide means for storing the cord when it is not in use to avoid tangling and interference with normal operations surrounding the area of the mounting means. Retractable reels for storage of such cords are known in the art and have had common limitations in their size as well as in their operation. Due to the rotation of the reel on which the cord is stored it becomes necessary to provide a moving means for connection between the fixed end of the cord on the reel and the power source. In the case of telephone cords such wiper arms on a central contact plate result in static and poor transmission of the electromagnetic impulses which are conducted to the handpiece carrying the receiver and speaking elements. The interference which is developed during the rotation of he reel by the wiping of the contacts across a rotating conducting cylinder produces a static as well as a point for collection of dirt which often develops into a malfunction of the telephone. Similarly, in the case of electrical transmission cords for use with items like trouble lights, they require a bulky assembly to protect and provide insulation against short circuiting of the contacts with the balance of the assembly.

SUMMARY

The present invention relates to an automatic retractable cord reel which provides a continuous solid connection from one extremity of the extensible cord to the fixed end of a conductor connected to the power source. This is accomplished by utilizing a coaxially disposed encircling arrangement of parts that permits a compact size for introduction of extensible cord reels within limited environmental space. The continuous connection is accomplished by disposing the cord on the reel in a helical disposition of a predetermined hand with the inner end of the cord fixedly connected to the outer extremity of a flat helically disposed conductor having a number of conducting paths at least equal to the cord wires and arranged within a second cavity of the reel. The flat conductor is disposed in a helical winding of an opposite hand to the disposition of the cord whereby the paying out of the cord tends to unwind the outer convolutions of the flat conductor and to rewind the flat ribbon-like conductor when the cord is rearranged on the reel. With this arrangement the inner end of the flat conductor can be fixedly connected to a source of power, thereby providing a continuous solid conductor from the source to the free extremity of the cord at all times. Additionally the arrangement of the invention is such that economies in fabrication can be realized while providing consistent and reliable service.

BRIEF DESCRIPTION OF DRAWINGS

FIG. 1 is a perspective view of a preferred embodiment of the invention in mounted relation to a panel with the panel being shown in phantom for clarity of illustration;

FIG. 2 is an exploded view in perspective of an embodiment of the present invention;

FIG. 3 is an elevational sectional view of the embodiment of the invention showing the elements of FIG. 2 in assembled relationship;

FIG. 4 is a plan view of the casing utilized to house the power retraction spring;

FIG. 5 is a partial plan view showing the engagement between the power retraction spring and the casing of FIG. 4;

FIG. 6 is an end view of a spring clip which serves as a pawl and is mounted on the spring casing;

FIG. 7 is a partial plan view showing the inter-relationship of an assembled spring casing and pawl with a base or housing member;

FIG. 10 is a plan view of the bottom of the bushing; and

DESCRIPTION OF PREFERRED EMBODIMENTS

Figure 8:
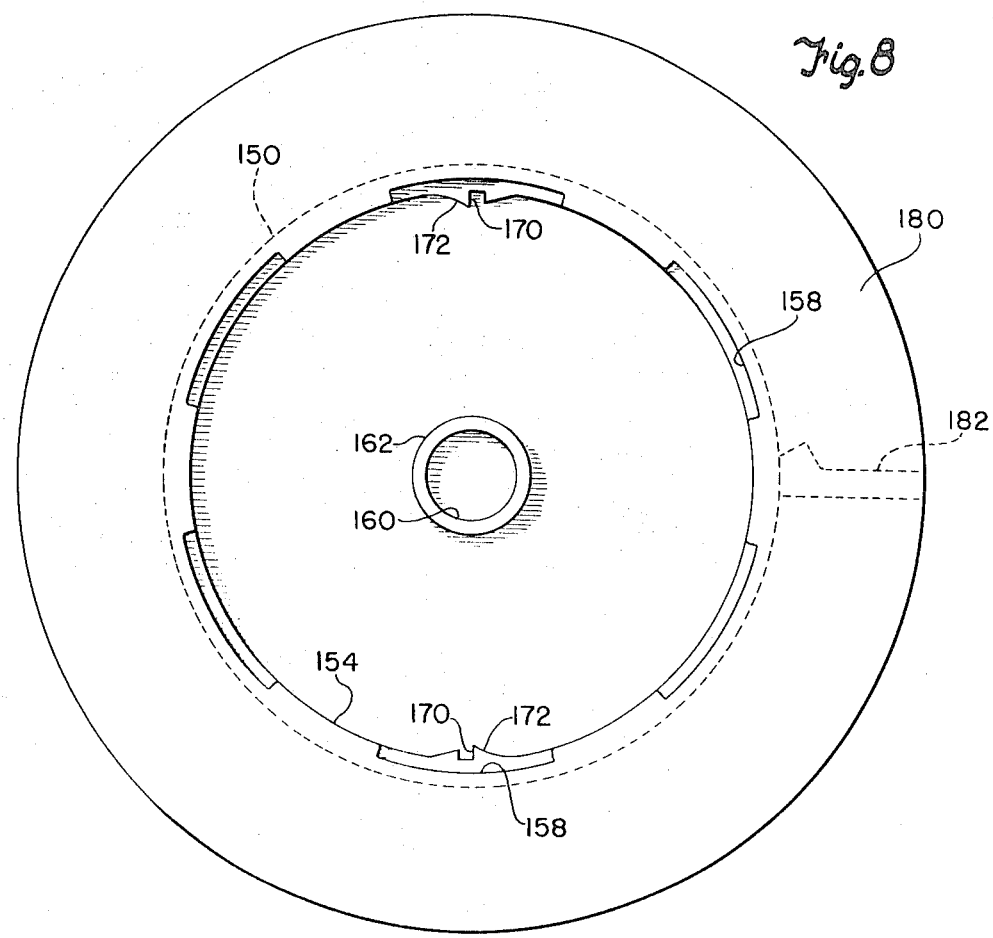
FIG. 8 is a plan view of one end of the reel element.

An automatic retractable cord reel 10 of the type contemplated by this invention can be mounted on the blind side of a panel 11 by means of a suitable L-shaped bracket 12 with mounting screws 14 and having the free end of the cord passing through an aperture 16 for availability on the front side of the panel. The cord reel 10 is an assembly which includes a base or housing 20, a power retraction spring 22 acceptable within a casing 24 having a cover plate 26, a shoulder stud 28, a reel 30 carrying the cord 32, a bushing and flat spring-like conductor sub-assembly 34, and a cover 36. All of the elements of the assembly are adapted to be coaxially combined and disposed in encircling relationship to provide a compact, substantially trouble-free, efficient assembly.

Referring now more specifically to the drawing, the base or housing 20 has an annular base 40 having a central counterbore 42 with a plurality of circumferentially spaced ratchet teeth 44 extending radially inwardly from the sidewall of the counterbore, for purposes best set forth hereinafter. Extending axially from the center of the base 40 is a hollow post 46 having a central bore 48 and a plurality of circumferentially spaced protuberances 50 extending axially from the free end of the post 46. Surrounding the post 46 in radially spaced relation is a bearing ring 52 which extends axially from the base 40 a shorter distance than the post 46. The outer peripheral edge of the base 40 is circumscribed by a sidewall or flange 54 having a slot or port 56 which is generally tangentially disposed relative to the annular base. The wall 54 supports a lateral extension 58 having a radiused inner groove 60 forming a throat communicating with the slot or port 56 to provide a smooth entrance surface. Extending axially in the opposite direction from base 40 are the extensions 62 which accommodate threaded bushings 64 for acceptance of screw threaded members to mount the base relative to the bracket 12 or any other supporting surface.

A power package includes the power retraction spring 22 which is a helically disposed flat spring, or any other acceptable spring form, having its inner and outer extremities 70 and 72 reversely bent to form tangs for the transmission of the stored energy, much in the fashion of the main spring of a watch. The casing 24 is an annular member having a planer base 76 with an axially extending hollow centrally disposed bearing member 78 which extends axially in opposite directions beyond the base 76. The central bore 80 of the bearing member 78 is sized so as to be readily accepted in mounted relationship on the post 46 and with the axial extension of the bearing member 78 beyond the opposite face of the base 76 adapted to be accepted within the space between the bearing ring 52 and the post 46 so as to provide lateral stability to the casing when in mounted relation. The length of member 78 and ring 52 are controlled so that base 76 bears on the upper surface of ring 52. Extending axially from the base 76 and circumferentially disposed thereabout is a sidewall or flange 82. The wall 82 includes a plurality of circumferentially spaced radially outwardly disposed segments 84, as in the fashion of splines. One of the sections 84 includes a slot 86 adapted to accept the reversely bent tang portion 70 of the spring 22, as best seen in FIG. 5, for purposes of transmitting the stored spring power to the casing 24. Diametrically opposed from slot 86 is a second slot 88 which is axially disposed between the wall 82 and a web 90. The slot 88 is adapted to accept a U-shaped spring clip 94 with one leg 96 provided with barbs 98 for positive engagement within the slot 88. The opposite leg 100 has an outwardly extending tine 102 at its free extremity for purposes best set forth hereinafter. The spring 22 has its helical convolution so disposed as to be freely acceptable within the confines of the casing wall 82 and its central convolution is of sufficient diameter to be readily accepted over and radially spaced from the central bearing 78.

Figure 9:
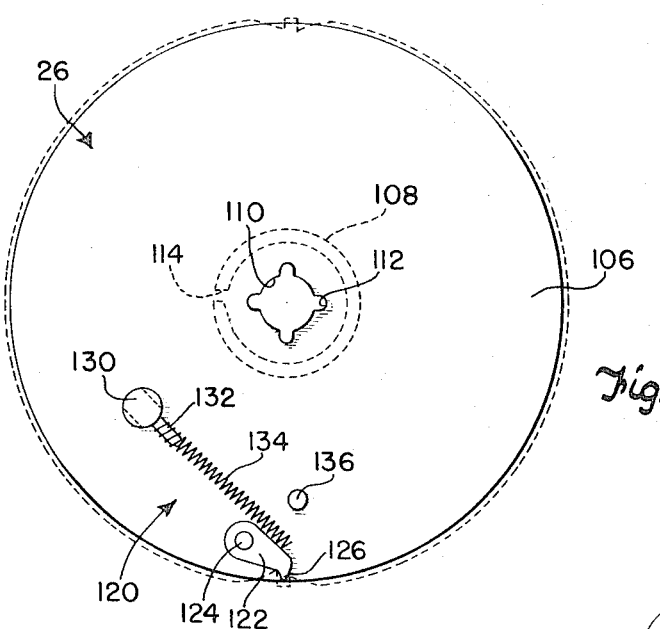
FIG. 9 is a plan view of the spring casing cover with a portion of the reel superimposed in phantom.

Cover plate 26 is an annular planer member 106 having a hollow sleeve 108 extending axially from one face thereof. Plate 26 is further provided with a reduced diameter aperture 110 communicating with sleeve 108. Aperture 110 includes a plurality of radially extending notches 112 communicating with aperture 110. The sleeve 108 includes an axially extending slot 114, as best seen in FIGS. 2 and 9, and has a bore capable of accepting bearing member 78 but sleeve 108 is preferably shorter in axial extent than member 78. The assembly of the power unit including the spring 22, casing 24 and cover plate 26 is accomplished by the axial telescoping of the members onto the post 46. The tang 102 of the clip 94 is so dimensioned as to be actively disposed as a pawl between adjacent ratchet teeth 44 of the base or housing 20. The spring 22 is then telescoped over the central bearing 78 with its outer tang 70 engaged within the slot 86. The cover plate 26 is aligned so that the inner tang 72 of the spring is captured within the slot 114 of sleeve 108 and the notches 112 are aligned with and accept the protuberances 50 of post 46. The shoulder stud 28 is then telescoped through aperture 110 into threaded engagement with the bore 48 of post 46. The bore 48 may be prethreaded or stud 28 may form its own threads therein. In this fashion spring 22 has its inner tang 72 fixed due to the interengagement of the notches 112 with the protuberances 50 on the base post 46 while the casing 24 can be rotated relative to the base in a counterclockwise direction, as viewed in the drawings, with the spring clip 94 serving as a pawl acting against the ratchet teeth 44 to retain the spring 22 in preloaded tensioned relationship.

Positioned on the opposite side of cover plate 26 from the slotted sleeve 108 is a spring loaded pawl mechanism 120 which includes a dog 122 axially mounted in rotatable fashion on a post 124 and having a tongue 126 at its free extremity opposite the post 124. Tangentially spaced from dog 122 is post 130 and includes laterally extending extension 132 adapted to accept one end of a coil spring 134 whose opposite free extremity bears against the dog 122 on the side opposed to the tongue 126. The angular positioning of post 130 and its extension 132 can be oriented to control the degree of pressure that spring 134 will exert against the dog 122. A second post 136 is provided to serve as a bearing member to prevent dog 122 from inverting or reversing itself from its normal position of having the tongue 126 at its free extremity disposed radially outwardly from the periphery of the cover plate 126, for purposes best set forth hereinafter.

As was previously described the shoulder stud 28 includes a threaded portion 140. It also includes a second unthreaded increased diameter portion 142, an enlarged solid cylindrical portion 144 having an annular smooth outer surface and a fourth portion 146 which is non-circular and includes a central threaded bore 148 opening through the free end of stud 28 opposite the threaded portion 140, for purposes best set forth hereinafter.

As best seen in FIGS. 2, 3, and 8, the reel element 30 includes a central cylinder 150 covered at one extremity by a planar member 152 and on its interior forms a bore portion 154 and a counterbore 156. The bore 154 preferably has its inner walls interrupted by a series of circumferentially spaced axially extending spline-like slots 158 adapted to accept the segments 84 of the spring casing 24 to key the casing 24 to the reel 30. The planar member 152 has a central aperture 160 and a short axially extending bearing sleeve 162 which extends into the bore for a short distance. It will be noted that the slots or splines 158 only extend through the axial extent of the bore portion 154 but do not extend into the counterbore. The counterbore portion of the cylinder preferably includes ratchet slots 170 in diametrically opposed relation and each have cam rises 172 leading to the slot 170. It will be noted that slot 170 is adapted to accept the tongue 126 of the spring urge dog 122 with the cam rises 172 being so disposed as to permit the tongue to override the slot when the peripheral speed of rotation of the reel reaches a certain level. The disposition of the cam rises 172 and slots 170 to the dog 122 is shown in phantom in FIG. 9.

Extending radially outwardly from opposite ends of the cylinder 150 are flanges 180 to form a toroidal-like radially open cavity for the acceptance of a cord 32. One of said flanges 180 is provided with a slot 182 communicating with the cavity formed by the flanges and providing an egress point for the inner end of the cord to pass through. Extending axially outwardly and disposed on the face of one flange 180, in a direction opposite to the opening of the cylinder 150, is a connector housing 190 and a cylindrical wall 194, the latter being coaxially disposed relative to the aperture 160 in encircling relationship and forming a cavity therewithin with the opposite face of the planar member 152. The wall 194 also has a slot 196 communicating with the connector cavity 190, for purposes best set forth hereinafter.

Circumferentially disposed about the outer portion of wall 194 are a plurality of mounting lugs 200 each provided a central tapped bore 202.

The reel 30 is adapted to accept a cord 32 of predetermined length within the confines of its flanges 180 with the inner end of the cord extending through the slot 182 into the connector cavity 190. The opposite free end of the cord 32 is adapted to extend through the slot 56 and the throat 60 when assembled to the housing 20 for exterior connection.

The cavity formed by the wall 194 is adapted to accept a bushing and flat spring-like conductor assembly 34. The bushing 210 has a central body generally shaped like a modified archimedian spiral and has extending from one extremity an annular smooth bearing means 212 with a central pass through bore 214. The bottom or opposite surface of the bushing 210, as best seen in FIG. 10, includes a complementary spiral slot 216 which communicates at its inner end with an axially extending generally rectangular pass through bore 218. Centrally located on this bottom surface is a noncircular cavity 220 which surrounds the bore 214 and is complementary in shape to the noncircular portion 146 of the shoulder stud 28. Encircling the bushing 210 in a helical disposition is a flat ribbon-like multiple path conductor 230. The conducting paths are disposed in parallel relationship within an insulating body that has spring-like characteristics. One extremity of the conductor 230 extends through the slot 196 into the connector cavity 190 and is directly attached to the free ends of the conductors in cord 32 which extend through the slot 182 into the opposite end of the connector cavity 190. It is desirable to provide a strain relief means on the free end of cord 32 to prevent damage to the attachment of the cord to the conductor 230 when an overload of tension is applied to cord 32 in its extended position. The opposite or free end of the wire 230 passes through the spiral slot 216 and is then exited through the rectangular bore 218 for connection to an outside power source, as will be described later.

To assemble the electrical components of the cord reel, the reel 30 is telescoped, as has been previously mentioned, into engagement with the splines 84 of the spring casing, with the splines 84 engaging the grooves 158 in the reel cylinder. As this is accomplished, the wall of groove 158 will depress the leg 100 of the spring pawl 194 and remove it from engagement with the ratchet teeth 44 of the base, thereby placing the cord reel under a spring loaded condition. The bushing body 210 has its noncircular bore 220 brought into engagement with the non-circular position 146 of the shoulder stud 28 and thereby fixed in a non-rotative position relative to the base 20 and secured thereto by a screw 240 which is threadedly accepted within the bore 148 of the shoulder stud 28. The lower end, as viewed in FIG. 3, of the reel is located and supported for rotation by the casing 24 while the upper end is supported against wobble by the bearing sleeve 162 encircling the smooth enlarged portion 144 of the shoulder stud 28.

A removable cover 36, having a raised central portion 250 and a peripheral flange 252, is centrally apertured as at 254 and adapted to accept the annular protuberance 212 of the bushing 210. The cover is carried by and maintained in place on the reel by screws 258 which are threadedly accepted within the tapped bore 202 of the mounting lugs 200.

Thus, cord 32 is a multiple wire conductor which at its free end is provided with a connector 260 for attachment to a suitable utility such as a telephone, a trouble light or any other suitable device with which it is to be utilized. The cord is disposed on the reel in a definite hand, for example in the embodiment disclosed it is rolled up in a left hand helical disposition while the flat conductor 230 is disposed about the bushing in the opposite hand, in the illustrated embodiment, in a right hand disposition as viewed from the left end of FIG. 2. The free end of the flat conductor 230 which emits from the bore 218 can be provided with suitable connectors 262 such as spade-type connectors for positive connection with a power source. As the cord 32 is unrolled or extended out from the reel by a force applied in opposition to the spring tang 70, the flat conductor 230, which has its inner end fixed to the bushing and the base will unwind the helically disposed convolutions within the cavity formed by the wall of 194. Conversely, as the pulling force is released from the connector 260 and the cord permitted to rewind on the reel, through the stored power of the spring 22 acting through the casing 24, the flat conductor 230 will then wind up. Such a wind-up procedure results from a dual action, namely, by reverse spring powered rotation of the reel and secondly by the inherent spring-like characteristics of the ribbon-like conductor per se.

It will be apparent that there is a continuous connection between the extremity of the cord represented by its connector 260 and the free end of the flat conductor 230 represented by the connectors 262 which can be applied to a power source. As was previously discussed this is very important to audio transmissions such as in telephone or amplified microphone transmissions or in general electrical connections as well. All of the elements in the assembly, with the exception of the conductors, the connectors, the screws, and the springs, can be injection molded from suitable insulating plastic materials which by their lubricious nature provide excellent bearing materials which permit easy rotation that should never require external lubrication for the life of the product.

Should it be necessary to replace a cord in this embodiment it is only necessary that the cover 36, the bushing 34 and the reel 30 be removed. When the reel is slipped axially from its encircling relation to the spring casing 24, the leg 100 of the spring pawl 94 will move radially outwardly to re-engage the ratchet teeth 44 and thereby maintain the spring in its slightly wound condition. Removal of the cover 36 from the surface of the reel permits ready access to the connector cavity 190 where new connections can be made between the cord and the flat conductor 230.

Figure 11:
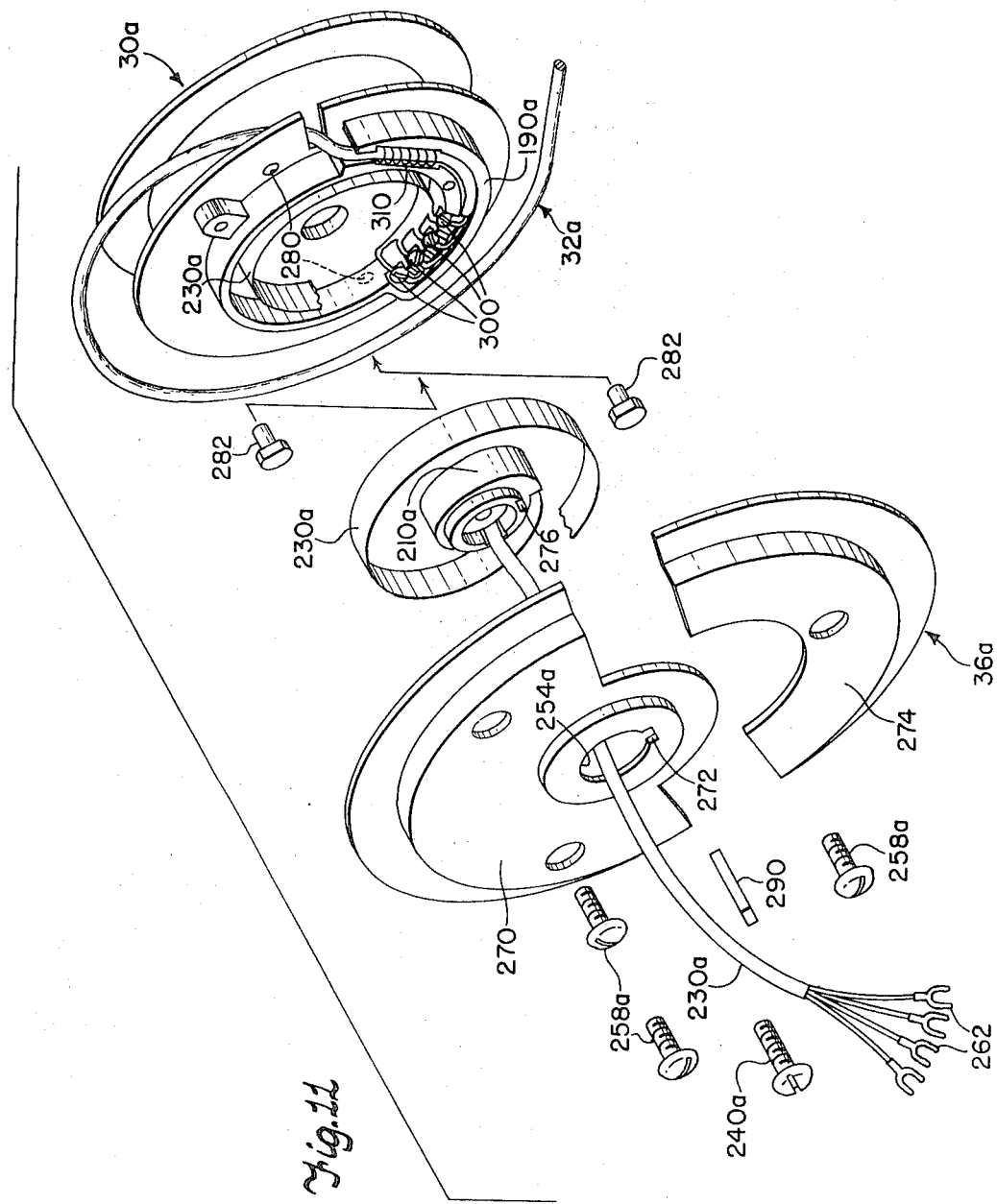
FIG. 11 is an exploded view in perspective of a second embodiment of the present invention.

A further embodiment of the present invention is disclosed in FIG. 11 of the drawing wherein similar parts will be identified by similar numerals with the addition of the suffix "a." In this embodiment the variation relates to a simplified means for replacement of a worn or damaged cord. It includes a split cover 36a having a basic portion 270 which includes the central bore 254a and a laterally extending notch 272. A second segment 274 completes the cover. The bushing body 210a is provided with rectangular bore 276 which is complementary in shape and size to the notch 272.

The reel 30a is provided with a pair of apertures 280 which communicate through the flanges 180a with the counterbore 156a of the cylinder 150a and are disposed radially in front of the ratchet slots 170a, not shown. Complementary pins 282 are telescoped through the apertures 280 with their shanks positioned to block the slots 170a and prevent the tongue of the dog 122a from engaging in the slot and hence permit the reel 30a to be free moving.

The cord 30a is extended to its full length against the tension of the spring until the notch 272 is aligned with the bore 276. At that time a complementary key 290 is telescoped through notch 272 into bore 276. This will restrain the reel from rotating since the bushing 210a is restrained from rotation relative to the housing through the shoulder stud as in the previous embodiment. The removal of screw 258 to free the segment 274 of the cover will reveal the connector cavity 190a which in this embodiment has a plurality of terminals 300 adapted to mutually accept the respective ends of the wires in the cord 32a and the flat conductor 230a. Insertion of the new cord and connections with the terminals 300, removal of the key 290, override pins 282 and replacement of the cover segment 274 will place the reel in condition for reuse with the new cord. Additionally, the connector cavity 190a may utilize an appropriate strain relief means 310 to overcome undue stress placed upon the cord. The power spring assembly with its casing and the base or housing member is substantially identical in this embodiment as in the first embodiment and hence the details are not repeated or shown except where necessary to clarify the explanation.

In the operation of both of these embodiments the cord is extended by pulling on the connector 260, or the device to which the connector is attached. With the cord extended tension on the cord 32 is preferably slowly released until the dog 22 and its tongue 26 engages in one of the slots 170. At this point the cord 32 will remain in an untensioned relationship relative to the assembly. A slight tug on the cord 32 results in disengagement of the dog 122 from slot 170 and rapid release will permit the dog 22 to override the slot by skipping up the cam rise 172 and to fall into the smooth wall counterbore rather than into the slots. Control of the cord position is therefore a function of the angular velocity of reel 30.

Thus, each of the components of this assembly are coaxially fixed or rotatable relative to one another and physically disposed in an encompassing or captured relationship with certain of the elements such as the spring casing cover plate and sleeve being fixed relative to the base as is the bushing and inner end of the flat conductor when mated with the shouldered screw. The spring casing and reel as well as the cover for the reel are rotatable relative to the base and keyed together except under certain circumstances to provide an automatically retractable cord reel capable of being fabricated of injection molded insulating plastic parts which are lubricious in nature and do not require additional lubrication throughout the life of the article. The cord, which is subject to stress and wear as it is drawn through the throat 60 can be readily replaced at infrequent intervals without disturbing the power package of the assembly. This results in a device which is readily assembled and is economical in total cost in relation to other available units.

I claim:

1. An automatic retractable cord reel including base means, a rotatable reel mounted on said base and including a first cavity means adapted to accept an elongated conductor cord means, energizable power means adapted to act on said reel means, a coaxial second cavity on said reel having end walls spaced a predetermined distance, said cavity adapted to accept a flat conductor having a width less than said predetermined distance and so proportioned to insure successive layer winding without tangling, the outer end of said conductor being connected to said cord while the inner end of said conductor remains stationary relative to said base means for fixed connection to a source, said flat conductor further having its helix disposed in an adjustable coil capable of varying the radii of its locus of points, whereby said cord and said second conductor form a continuous connector with one end fixed to said outside source and the opposite end being the free end of the cord which is capable of being played out tangentially from the periphery of the reel.

2. A device of the type set forth in claim 1 wherein said adjustable coil is a ribbon of material having a plurality of conductors insulating by disposed in parallel relation with said ribbon having a resilient characteristic to react as a coil spring being uncoiled during feed-out of said cord and coiled during feed-in of said cord.

3. A device of the type set forth in claim 2 wherein said reel includes ratchet means adapted to cooperate with pawl means when said reel is slowly rotated to retain said reel in a predetermined angular position, said pawl and ratchet means adapted to be released and capable of being overridden when said reel attains a certain angular velocity to permit rewinding of said cord.

4. A device of the type set forth in claim 3 wherein the pivot point of said pawl is fixed relative to said base and said cooperating ratchet is carried by said rotating reel.

5. A device of the type set forth in claim 1 wherein said energizable power means is a coiled spring which can be adjusted in strength.

6. A device of the type set forth in claim 5 wherein said coiled spring is restrained at its inner diameter and connected at its outer extremity with a casing having means to interconnect with the reel to urge the reel in a direction for retraction of said cord.

7. A device of the type set forth in claim 6 wherein said casing includes at least one external spline to interconnect with said reel to induce rotation, means associated with said casing adapted to cooperate with said base to permit said spring to be wound up prior to assembly with said reel.

8. An automatically retractable cord reel including base means having a central upstanding fixed post member and a peripheral flange projecting in the same direction as said post, annularly disposed fixed ratchet means located intermediate said post member and said peripheral flanges coiled watch-like spring means having its inner end fixed relative to said post, a casing rotatably mounted relative to said post and encompassing and urged in a given direction by said spring, resilient ratchet clip means mounted on said casing and normally extending outwardly into engagement with said fixed base ratchet means whereby said spring can be wound up by rotation of said casing and maintained in its stressed condition, first cover means fixed relative said post and axially retaining said spring in said casing, reel means having axially spaced radially extending annular flanges and a central axially grooved counterbore adapted to encircle said casing and mesh with the splines of said casing and to release said ratchet clip means, said reel flanges adapted to be encompassed by the peripheral base flange, elongated conductor cord means adapted to be wound up between said flanges, a second central cavity means axially oppositely disposed from said central counterbore, bushing means disposed within said second central cavity and fixed relative to said first post, helically disposed conductor means encircling said bushing and disposed within said second central cavity, said last mentioned conductor means being fixed relative to said bushing and being helically disposed of opposite hand to said cord means, said cord and said conductor means having their inner and outer ends respectively connected, centrally apertured second cover means removably mounted on said reel and covering said second cavity and rotatable relative to said base, said second cover means having said conductor means feeding axially outwardly through said central aperture, said base peripheral flange having an aperture therein generally tangentially disposed relative to said reel whereby said cord can be drawn from said reel against the tension of said spring and means for mounting said base relative to a work plate.

9. A device of the type claimed in claim 8 wherein said first cover means carries pawl means engageable with ratchet means in the counterbore of said reel whereby said spring loaded reel and its associated cord can be stopped in a predetermined position, said ratchet means being capable of being overridden when the angular velocity of said reel reaches a predetermined level.

10. A device of the type claimed in claim 8 wherein said conductor means is ribbon-like with a plurality of conductors being disposed in parallel fashion and said ribbon being spring-like and self-contracting.

11. A device of the type claimed in claim 8 wherein said bushing includes a spiral-like slot communicating with an axially extending bore and adapted to accept said conductor within said slot and bore.

12. A device of the type claimed in claim 8 wherein said fixed bushing is adapted to cooperate with means for restraining said second cover and hence said reel from rotating, said second cover having a portion thereof which is removable to provide access to the connection between the cord and conductor whereby a worn cord can be readily replaced without removal of the entire assembly.

* * * * *